April 27, 1954 — J. SCUDERI — 2,676,831
REMOVING AND MOUNTING APPLIANCE FOR AUTOMOBILE WHEELS
Filed Dec. 29, 1951

JOHN SCUDERI
INVENTOR
BY Joseph Blacker
ATTORNEY

Patented Apr. 27, 1954

2,676,831

UNITED STATES PATENT OFFICE 2,676,831

REMOVING AND MOUNTING APPLIANCE FOR AUTOMOBILE WHEELS

John Scuderi, Brooklyn, N. Y.

Application December 29, 1951, Serial No. 264,123

3 Claims. (Cl. 294—15)

This invention relates to an appliance for removing and mounting vehicle wheels and without soiling the hands of the person handling the tire.

An object of this invention is to provide a hinged flexible band of a size to extend around one-half the circumference of a tire and having two hand grips secured thereto and whereby the user may grip the tire and remove the wheel and tire off the axle with ease.

Another object of this invention is to insert pointed pins in the central portion of the hinged band and facing inwardly toward the axle and so that the pointed pins will enter into cavities in the outer surface of the tire and retain the band in alinement with the tire and prevent slippage between the band and the tire.

Another object of this invention is to form each hand grip of substantially semi-circular form and of a size to extend past the center line of the tire so as to pass the center line of the tire under pressure and to grip the tire due to the resiliency of the rubber or due to the resiliency of the hand grip and will stay on the tire when once applied to it.

Another object of this invention is to make both ends of the hand grips of rectangular form and to bend one end portion in far spaced relation from the tire and to mount a handle at the far end, there being considerable space between the handle and the tire to prevent contact of the fingers of the operator with the tire and so that the hands of the operator will remain clean.

More specifically, this invention provides a tire carrier for vehicles, whereby the user may change a tire with ease and without soiling his hands.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which.

Figure 1:
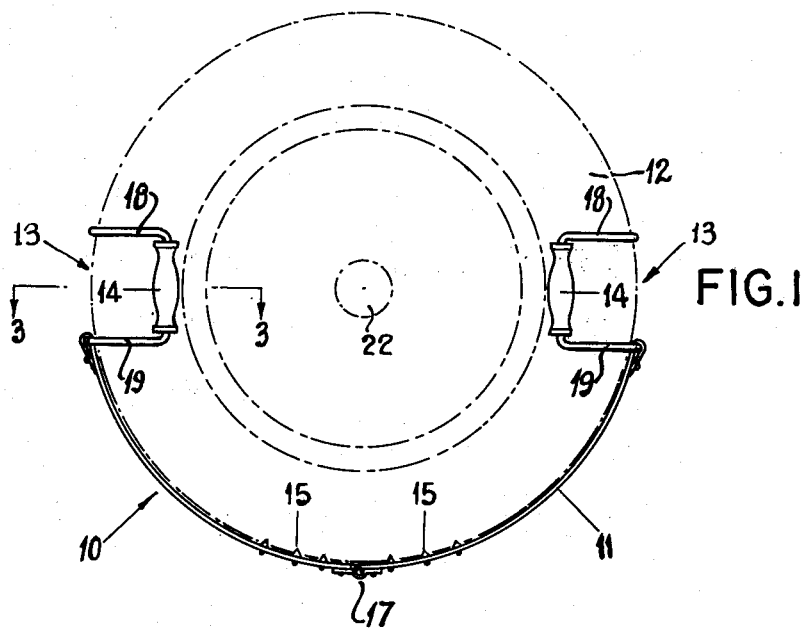
Figure 1 is a side elevation of a tire mounted on a wheel and to which my invention is applied.

In the illustrated embodiment of the invention, the numeral 10 indicates an appliance for removing and mounting vehicle tires. The appliance 10 comprises an elongated flexible band 11 preferably made of metal and of a length extending to diametrically opposite portions of a tire 12.

The band 11 has two resilient bifurcated frames 13, 13 of substantially semi-circular cross-section suitably secured thereto. The distance between points 16, 16 at the free ends of the semi-circular portion 13 of the frame 13, is less than the thickness of the tire so as to adapt the frames for frictionally and firmly gripping the tire on opposite side walls.

The frames 13, 13 have handles 14, 14 positioned in juxtaposed relation to the axis of the tire, that is, when the appliance is mounted on the tire.

The handles 14 extend in parallel relation with a side face of the tire and are considerably spaced away from and out of contact with the tire. The band 11 is in contacting relation with a large portion of the outer periphery of the tire.

A plurality of pointed prongs 15 are suitably secured to the band 11, and in service position, project upwardly and radially of the tire and are in engaging relation with outwardly extending portions of the tire, defining cavities in the tread of the tire and causing positive engagement with the tire.

Figure 2:
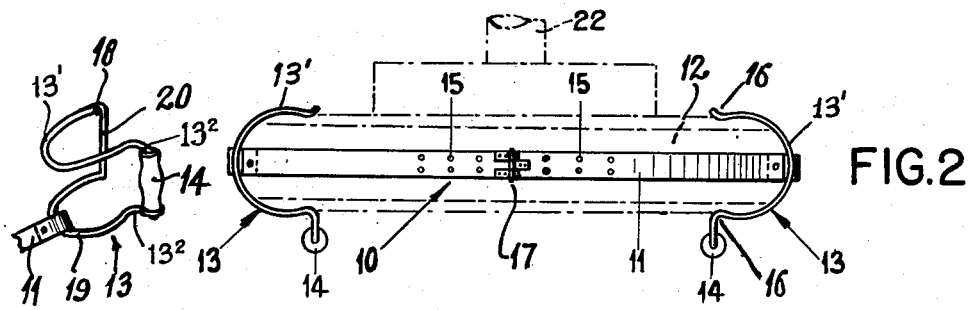
Figure 2 is a top plan view of the tire and wheel shown in Figure 1.

As shown in Figures 1 and 2, I provide a hinge 17 at the middle of the band 11. The hinge 17 permits the appliance to be folded to occupy a minimum of space in the trunk of the automobile.

Figures 3, 4:
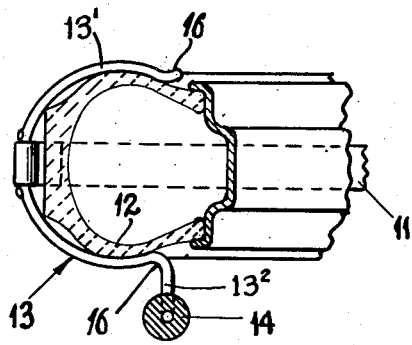
Figure 3 is a cross-sectional view taken on line 3—3 in Figure 1.
Figure 4 is a perspective view of a tire gripping frame.

As best shown in Figure 4, each frame 13 has upper and lower tire gripping portions 18, 19 and a vertical tie member 20. The mid-portion of each frame 13 is at the middle of the handles 14 and is on a line with the axis of the tire.

It will be noted that the grip of the prongs at the middle of the band 11, jointly with the grip of the two resilient frames 13 provide three points of securement with the tire which are located in triangular relation when mounted on the periphery of the tire.

As shown in Figure 1, it will be seen that the upper and lower tire gripping portions 18 and 19, of each frame 13 are spaced apart equally from the axis of the tire. This is accomplished by predetermining the length of the connecting band 11. It is obvious that this arrangement assists in maintaining the axial alinement of the axle 22 and tire 12 during the removal of the wheel.

As best shown in Figures 3 and 4, it will be seen that the frame 13 has right-angular extensions 13², which are of considerable length so as to cause the handle mounting portion of the frame 13 to be considerably spaced away from the tire 12 so that the handle 14 will at all times remain in clean condition for the user to place his hands thereon without soiling his hands.

In accordance with the patent statutes I have described and illustrated the preferred embodiment of my invention, but it will be understood that various changes and modifications can be made therein without departing from the spirit of the invention as defined by the appended claims.

I claim:

1. An appliance for removing and mounting vehicle wheels and tires, comprising an elongated flexible band of a length extending around opposite portions of a tire, said band having two resilient frames secured to the end portions of said band, said frames being of substantially semi-circular cross-section and facing in oppositely disposed directions and thereby adapted for gripping said tire on opposite side walls, said frames having handles positioned in juxtaposed relation to the axis of said tire and positioned diametrically of said tire, said handles extending in angular relation with said band and considerably out of contact with said tire, said band being in contacting relation with substantially one-half of the outer peripheral surface of said tire, and pointed prongs on said band and positioned intermediate said handles, said prongs projecting upwardly and radially of said tire and in engaging relation with portions defining cavities in the tread of said tire to cause positive engagement of said band with said tire, said appliance permitting changing a soiled wheel and tire without soiling the hands of the user, said connecting band being of a length to cause said frames to grip said tire equally above and below the axis of said tire, to maintain the axial alinement of the axle and tire and thereby easing the removal of said wheel and tire.

2. An appliance for removing and mounting vehicle wheels and tires, comprising an elongated flexible band of a length extending around opposite portions of a tire, said band having two resilient frames secured to the end portions of said band, said frames being of substantially semi-circular cross-section and facing in oppositely disposed directions and thereby adapted for gripping said tire on opposite side walls, said frames having handles positioned in juxtaposed relation to the axis of said tire and positioned diametrically of said tire, said handles extending in angular relation with said band and considerably out of contact with said tire, said band being in contacting relation with substantially one-half of the outer peripheral surface of said tire, and pointed prongs on said band and positioned intermediate said handles, said prongs projecting upwardly and radially of said tire and in engaging relation with portions defining cavities in the tread of said tire to cause positive engagement of said band with said tire, said appliance permitting changing a soiled tire without soiling the hands of the user, said connecting band being of a length to cause said frames to grip said tire equally above and below the axis of said tire, to maintain the axial alinement of the axle and tire and thereby easing the removal of said wheel and tire.

3. The invention as defined in claim 2, wherein the said prongs are at the middle of the band and intermediate said handles, and jointly with the two resilient frames provide three points of securement with the tire and located in triangular relation when mounted on the periphery of the tire.

References Cited in the file of this patent

UNITED STATES PATENTS

| Number | Name | Date |
| --- | --- | --- |
| 140,364 | Griffing | July 1, 1873 |
| 652,532 | Cartland | June 26, 1900 |
| 807,405 | Stirling | Dec. 12, 1905 |
| 1,503,725 | Taylor | Aug. 5, 1924 |
| 2,385,913 | Fink | Oct. 2, 1945 |